Sept. 21, 1965   F. E. BUSCHBOM   3,207,332
SILO UNLOADER DRIVING MECHANISM AND METHOD
FOR TENSIONING DRIVING MEANS
Original Filed Dec. 8, 1961   2 Sheets-Sheet 1

INVENTOR.
FLOYD E. BUSCHBOM
BY
Moore, White & Burd
ATTORNEYS

Sept. 21, 1965 F. E. BUSCHBOM 3,207,332
SILO UNLOADER DRIVING MECHANISM AND METHOD
FOR TENSIONING DRIVING MEANS
Original Filed Dec. 8, 1961 2 Sheets-Sheet 2

INVENTOR.
FLOYD E. BUSCHBOM
BY
Moore, White & Reed
ATTORNEYS

United States Patent Office 3,207,332  
Patented Sept. 21, 1965

3,207,332  
SILO UNLOADER DRIVING MECHANISM AND METHOD FOR TENSIONING DRIVING MEANS  
Floyd E. Buschbom, Rte. 1, Long Lake, Minn.  
Continuation of application Ser. No. 157,916, Dec. 8, 1961. This application Mar. 4, 1964, Ser. No. 350,634  
16 Claims. (Cl. 214—17)

This application is a continuation of application Serial No. 157,916 filed December 8, 1961, now abandoned, for Silo Unloader Driving Mechanism.

This invention comprises a means for tightening the flexible elements of the drive system for a silo unloader or the like involving two belts or the like driven by a dual pulley or the like on a single driving source. Specifically, this invention comprises a tightening means adapted for use on a silo unloading structure in which a motor via one belt or the like drives a gear box through which the collecting mechanism and the motive structure are driven while the mechanism for conveying ensilage out of the silo is driven by a separate belt or the like powered by the same motor.

Accordingly, it is an important object of this invention to provide a novel dual flexible element drive adjustment mechanism for a silo unloader or the like.

It is another object of this invention to provide a dual drive adjusting mechanism in which there are two adjustments which may be separately actuated to adjust both driving means to proper tension.

It is a still further object of this invention to provide a dual belt or the like drive adjustment in which the driving mechanism is pivoted at a point close to a line intersecting one of the driven pulleys and the drive pulley while it is substantially outside a line extending between the centers of the other driven pulley and the drive pulley.

It is another object of this invention to provide a belt tightening structure that incorporates a motor mount that is both pivotally and slidably mounted on the frame of the machine for which it provides power.

It is a still further object of this invention to provide a belt tightening structure for a silo unloader or the like in which two belts are driven by a single motor and one of these belts is substantially longer than the other whereby a pivotally moving motor provided with a dual pulley will exert a greater tightening influence on one of the belts than it will on the other of the belts by reason of the pivot point being farther from the center line of one of the belts than the other of the belts.

It is a still further object of this invention to provide a belt tightening structure for a machine in which pulleys to be driven are spaced longitudinally of the frame and the motor to drive the pulleys is slidably movable on the frame by means of screw threads, and is also pivotally mounted thereon.

It is still a further object of this invention to provide a method of tightening dual drive belts uniformly.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which.

Figure 1:
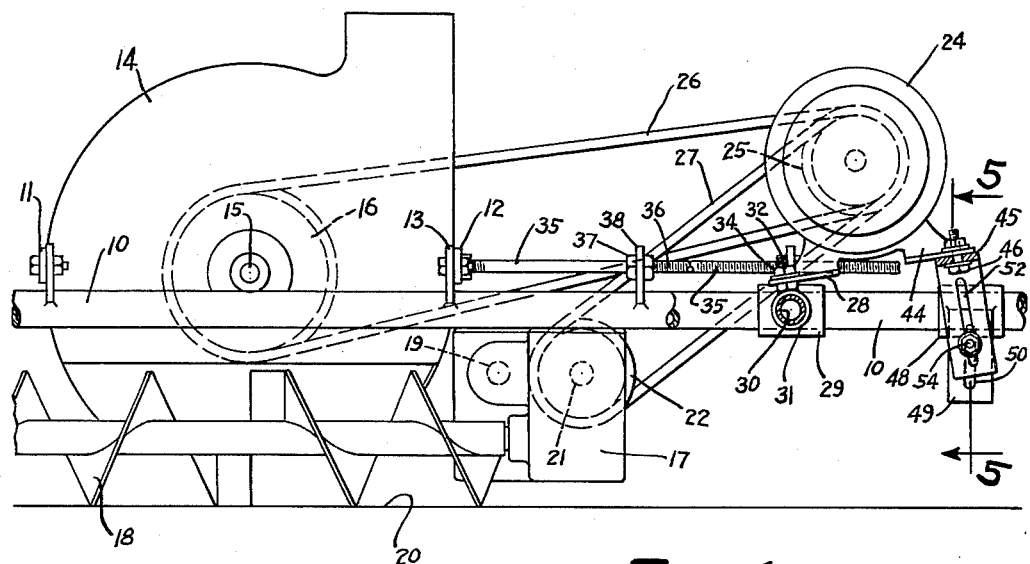
FIGURE 1 is a partial side elevation; partial longitudinal section taken on the line and in the direction of the arrows 1—1 of FIGURE 3; broken lines illustrate hidden parts.

In FIGURE 1, there is shown a fragment of the frame 10 of a silo unloader which comprises two elongated spaced parallel members, which may be tubes, that are interconnected by the bars 11 and 12 in spaced relationship via ears 13 on frame 10. An ensilage expelling structure, here shown as impeller 14, is rigidly secured to the bars 11 and 12 and has a shaft 15 journalled for rotation therein. (The silo unloader and impeller are of the type shown in Patents 2,794,560 and 2,877,907, to which reference is made, but are not described in further detail since they form no part of this invention per se.)

Shaft 15, however, carries a pulley 16 by means of which the shaft 15 and the hammers of impeller 14 (not shown but secured thereto) are driven.

As seen in FIGURE 1, a gear box 17 is secured between the frame members 10 in any suitable manner and serves as a speed reducer for both the collecting augers 18 and the shaft 19 which supplies power to force the unit over a surface such as that represented by the line 20. A shaft 21 extends from gear box 17 on which is mounted a pulley 22 by means of which the gear box shaft 21 and hence the gears thereof are driven. Motor 24 provides a source of power to drive the pulleys 16 and 22 via dual pulley 25 over which are reeved the belts 26 and 27 which engage the pulley 16 and pulley 22 respectively. In order for these belts to transmit power effectively between the motor pulley 25 and the pulleys 16 and 22, belts 26 and 27 must be maintained under proper tension. It is the motor mount means by which this tension is produced that is the principal concern of this invention.

One flange 28 of the motor 24 is secured to the frame 10 of the machine via a pair of slidable members or collars such as the one designated 29 in FIGURE 1. Between these collars extends a rigid member 30 to which the motor flange 28 is pivoted or hinged. A convenient manner of hinging motor flange 28 to tube member 30 is shown as the sleeves 31 that embrace member 30. Suitable means such as the studs 32 are secured to the sleeves 31 and nuts, as shown at 34, serve to clamp motor flange 28 to the pivoting sleeve members 31. The motor is, therefore, pivotally mounted on the tube 30 extending between the collars 29, and this comprises one method of moving the motor for tightening the belts. As will be appreciated, motor 24 may also be adjusted or translated axially on tube 30 and hence in relation to pulleys 16 and 22.

Figure 2:
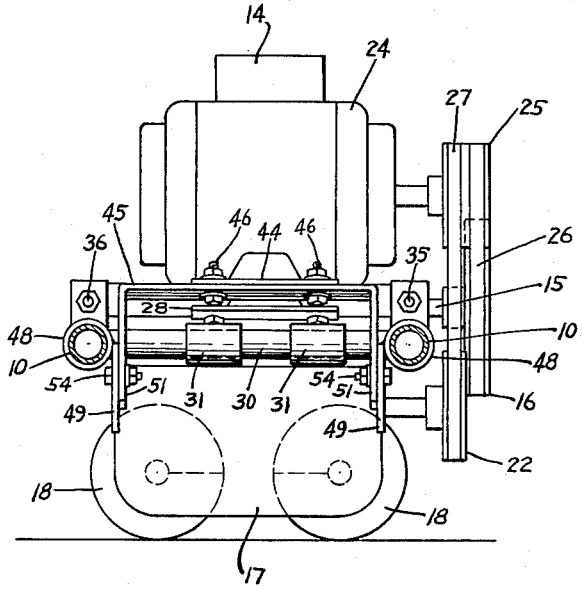
FIGURE 2 is an end elevation of the structure shown in FIGURE 1 taken from the right hand side of FIGURE 1; broken lines illustrate hidden parts.

Collars 29 may be slidable adjusted or translated along the frame members 10 by the threaded rods, one of which 35 (FIGURE 2) extends through one of the ears 13 and serves by reason of having nuts on both sides of the ear 13 and the element 12 to act as one of the anchors also for the element 12. The other threaded rod 36, only a fragment of which is seen in FIGURE 1, is similarly anchored by the nuts 37 in a separate ear 38 secured to one of the frame members 10 for that purpose.

Figure 3:
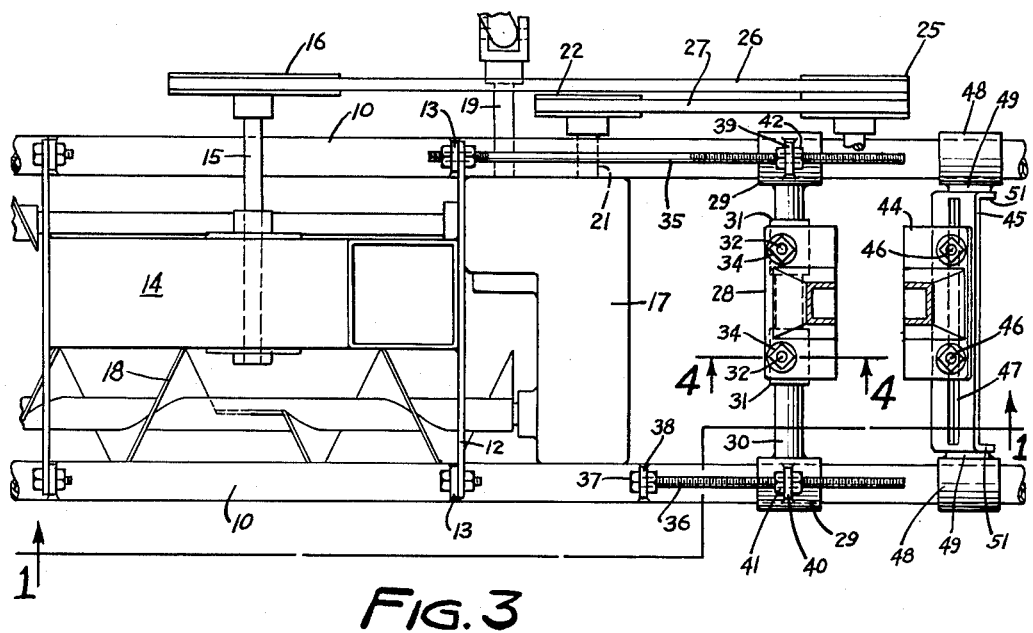
FIGURE 3 is a top plan view of a fragment of a silo unloader incorporating the structure of this invention with the motor deleted to illustrate construction more fully; broken lines illustrate hidden parts.
Figure 4:
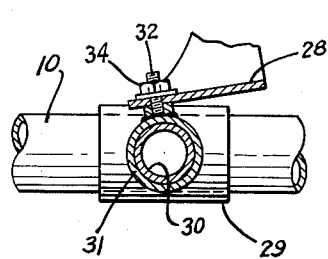
FIGURE 4 is an enlarged sectional view taken on the line and in the direction of the arrows 4—4 of FIGURE 3; broken lines illustrate hidden parts.
Figure 5:
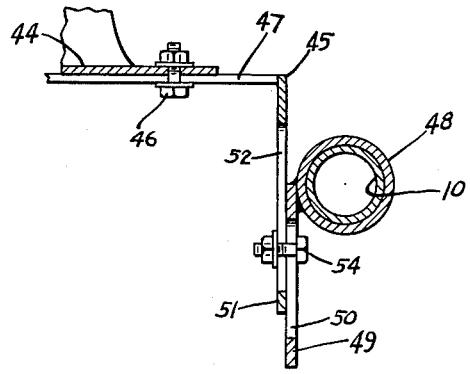
FIGURE 5 is a sectional view taken on the line and in the direction of the arrows 5—5 of FIGURE 1, and drawn to the same scale as FIGURE 4.

In FIGURE 3, these threaded rods appear clearly and are seen to extend through appropriate pierced ears as at 39 for rod 35 and 40 for rod 36 which ears are rigidly secured to the collars 29. A pair of nuts as at 41 for the rod 36 and 42 for the rod 35 serve to permit adjustment of the pierced ears 39 and 40 along rods 35 and 36 respectively. As the rods are anchored to the frame elements 10, appropriate adjustment of the nuts 41 and 42 will cause the collars 29 to be moved slidably along their respective frame elements 10. This is the other means for moving motor 24 to tighten belts 26 and 27.

The second pair of legs 44 of motor 24 are secured to a legged or U-shaped bracket 45 by means of suitable nut and bolt assemblies 46 extending through a slot 47 in bracket 45. Slot 47 extends entirely across the top of the bracket and hence an appropriate location of motor 24 laterally of the frame may be achieved easily by sliding the motor back and forth on the bracket 45 and the tubular member 30. In this manner an appropriate location of the pulley 25 may be made so that the belts 26 and 27 can extend straight to the pulleys 16 and 22 respectively.

Individually slidable on the frame members 10 are the elements 48 to which the term cuffs is applied to distinguish them readily from the collars. Each cuff is provided with a depending plate member 49 in which there is a slot 50. Bracket 45 has depending legs 51 which extend downward adjacent to the plates 49 of cuffs 48. Legs 51 are also slotted as at 52. Suitable nut and bolt assemblies as at 54 extend through the slots 50 and 52 and, by being tightened, frictionally fix the bracket legs 51 with respect to the plates 49.

To tighten belts 26 and 27, one proceeds as described below. The nut and bolt assemblies 54 are loosened and collars 29 are slidably adjusted along frame members 10 and away from the shafts 21 and 15 by backing off the nuts 41 and 42 nearer the free ends of the rods 35 and 36 and tightening their counterparts that are closest to the shafts 15 and 21. As collars 29 are moved slidably along the frame members 10, tension placed on the belts 26 and 27 by the weight of motor 24 will gradually cause the belts to lift the motor into a position such as shown in FIGURE 1 or higher. As the tube 30 is somewhat closer to the center line between the motor pulley 25 and pulley 22 than it is to the center line between motor pulley 25 and the pulley 16, belt 27 will acquire somewhat greater tension than belt 26. When the tension on belt 27 becomes close to desired tension, the nuts 42 and 41 are tightened against the ears 39 and 40 respectively to secure collars 29 in their adjusted position. Pressure is then applied to the motor 24 or motor leg 44 to cause a sliding movement of bracket legs 46 with respect to plates 49.

As the motor 24 pivots, the angle formed by lines drawn from the shaft 15 to tube 30 and from tube 30 to the shaft of motor 24 changes in size moving toward but without reaching 180 degrees. The angle formed by the line from shaft 21 to tube 30 and tube 30 to the motor shaft also changes in the same direction.

As the latter angle is more obtuse to begin with, than the angle including the line extending from shaft 15 to tube 30, this tendency for the two angles to become ones of 180 degrees will produce less tightening action with respect to belt 27 than it does with respect to belt 26. As belt 27 was brought to nearly operative tension by the sliding action of the motor mount, the two belts will both be in correct tension when pivoting of motor 24 has placed belt 26 under proper tension. Stated another way, as the motor is pivoted about tube 30, the two belts each are forced to describe an arc with respect to their respective shafts 15 and 21. These two arcs will intersect at only one place. This point of intersection is the point where both belts have been provided with appropriate tension.

It is apparent that many modifications and variations of this invention is hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A machine having a frame, two pulleys vertically spaced from each other on said frame, a motor mount horizontally slidably secured and longitudinally spaced in different amounts from said pulleys, means secured to said frame and said motor mount for determining its location on said frame, a motor pivotally secured to said motor mount at its side nearest said two pulleys and selectively slidably secured and clamped to said motor mount at its side removed from said two pulleys whereby the distance between said motor and each of said pulleys can be increased by different amounts by pivoting said motor and the distance between said motor and each of said pulleys can be increased by different amounts by sliding said motor mount.

2. A machine having a frame, two pulleys vertically and longitudinally spaced on said frame, a motor mount longitudinally slidably secured to said frame, means secured to said frame and motor mount for determining its location longitudinally on said frame, a motor inequitably spaced from each of said two pulleys and pivotally secured to said motor mount at its side nearest said two pulleys and means secured to said motor and motor mount at its side removed from said two pulleys to fix the pivotal attitude of said motor relative to said frame.

3. A machine having a frame comprised of a pair of spaced parallel tubes and having two pulleys rotatably mounted thereon at fixed locations, a pair of slidable members embracing said spaced parallel tubes, means rigidly interconnecting said slidable members, a second pair of slidable members embracing said spaced parallel tubes, a motor hingedly secured to said interconnecting means, a bracket secured to the other side of said motor and extending in close association to said second pair of slidable members, slots formed in said bracket adjacent said second pair of slidable members, a plate means secured to each one of said second pair of slidable members, a nut and bolt assembly extending through each of said plates and its associated bracket slot, a threaded means secured to said parallel frame members and extending past and engaging said pair of slidable members, and nuts on the threads of said threaded means for moving said pair of sliding members on said frame.

4. A machine having a frame comprised of spaced parallel members and having a pair of pulleys rotatably mounted thereon at fixed vertically and longitudinally spaced locations, a pair of slidable members on said spaced parallel members, means interconnecting said pair of slidable members, a second pair of slidable members on said spaced parallel members, a motor hingedly secured to said interconnecting means, and releasable means secured to said motor and said second pair of slidable members, a dual pulley on said motor, belts reeved around said pair of pulleys and said dual pulley, and means secured to said spaced parallel members and engaging said interconnected pair of slidable members to force the latter to slide in relation to the former.

5. The machine of claim 4 in which said releasable means is a legged bracket means secured to the other side of said motor with the legs of said bracket extending in close association to said second pair of slidable members, a clamp engaging each of said bracket legs and its associated one of said second pair of slidable members.

6. The machine of claim 4 in which said means for forcing said pair of slidable members to slide are pierced ears on said spaced parallel members and pair of slidable members, threaded rods extending through said pierced ears and nuts on said threaded rods to fix them in relation to some of said pierced ears and to force other of said pierced ears to move relative to said threaded rods.

7. A silo unloader mechanism having a frame consisting principally of two elongated, spaced, parallel members, an impeller secured to said frame intermediate of the ends of said spaced parallel elongated members, an impeller shaft rotatably extending from said impeller, a pulley secured to said impeller shaft, a gear box secured to said frame intermediate to the ends of said spaced parallel elongated members and also spaced longitudinally thereof from said impeller, the shaft extending from said gear box, a pulley secured to said gear box shaft, a pair of collars slidably mounted on said spaced parallel elongated members and nearer one end thereof than either said impeller or said gear box, a cylindrical member interconnecting said pair of collars, a pair of cuffs slidably mounted on said spaced parallel elongated members, a motor situated adjacent said pair of collars and hingedly mounted on said cylindrical member extending therebetween, a plate depending from each of said cuffs, a slot in each of said plates, a bracket secured to the other side of said motor and having depending portions thereof extending downward adjacent to said plates, slots in the depending portions of said bracket, nut and bolt assemblies extending through one of said plates and one of said depending portions and to frictionally fix them in relation to each other, a second nut and bolt assembly extending through the other of said plates and the other of said depending bracket portions to fix them to each other frictionally, elongated threaded rods fixed to the tops of said two elongated, spaced, parallel members and extending over said collars, pierced ears on said collars through which said elongated threaded rods extend, nuts on each of said elongated threaded rods on both sides of each of said ears, a dual pulley mounted on the shaft of said motor and belts reeved around said dual pulley and the pulleys of said impeller shaft and said gear box.

8. A machine having a frame, a pair of pulley means longitudinally and vertically spaced on said frame, a motor on said frame, dual pulley means on said motor longitudinally spaced from said two pulleys by different amounts and inequitably related to said two pulleys vertically, two belt means each engaging one of said two longitudinally and vertically spaced pulley means and one of the dual pulley means on said motor, said motor being pivotally secured to said frame, means for placing the point of pivotal attachment of said motor to said frame farther from the center line of one of said belts than the other of said belts, and separate means for fixing the pivotal attitude only of said motor with respect to said frame.

9. A belt tightening structure comprising a frame, two pulleys secured rotatably to said frame in spaced longitudinal and vertical relationship, a dual pulley movably secured to said frame and spaced longitudinally and vertically from at least one of said two pulleys and at least longitudinally from the other of said two pulleys, means for moving said dual pulley linearly with respect to said frame, means for moving and positioning said dual pulley arcuately with respect to said two pulleys independently of said linear movement, and belts interconnecting each of said two pulleys with said dual pulley; said means for moving said dual pulley linearly tightening both of said belts and one more than the other; said means for moving said dual pulley arcuately tightening both of said belts and the other more than the one.

10. The belt tightening structure of claim 9 in which a support means supports said dual pulley and said support means is axially translatable relative to said two pulleys.

11. A drive mechanism comprising a frame, two circular driven members rotatably secured to said frame in longitudinal and vertical spaced relation to each other, a motor mount means translatably and pivotally secured to said frame in longitudinally and vertically spaced relation to said two circular driven members in the same direction but in different amounts, a dual driving member compatible with said two circular driven members secured to said frame via said motor mount, flexible members interconnecting said two circular driven members with said dual driving member and means for fixing said motor mount in a selected translated and pivoted position.

12. The drive mechanism of claim 11 in which said motor mount is secured to said frame for translation in two directions normal to and independently of each other.

13. A method of tightening two belts each reeved around a dual driving pulley and either of two single pulleys comprising, spacing said single pulleys vertically from each other, placing said single pulleys longitudinally differently with respect to said dual pulley, moving said dual pulley in a straight direction so as to increase the distance between one of said single pulleys and said dual pulley more rapidly than the other, moving said dual pulley in a curved path so as to move said dual pulley away from said other of said single pulleys more rapidly than said one, and fixing the position of said dual pulley when the tension on said two belts is substantially equal.

14. The method of tightening two belts of claim 13 in which moving said dual pulley in a curved path comprises of pivoting it at a fixed distance about an axis.

15. The method of claim 13 in which said straight movement is caused by sliding in a substantially horizontal direction and said curved motion is caused by generating an arc by moving said dual pulley at a fixed distance about an axis located between said single pulleys and said dual pulley.

16. A method of tightening dual belts reeved around a dual pulley and two single pulleys comprising, placing said single pulleys vertically and longitudinally differently relative to said dual pulley, moving said dual pulley in a straight path to move it away from one of said single pulleys at a greater rate than the other, moving said dual pulley in a curved path to move it away from said other single pulley at a greater rate than said one single pulley and fixing the position of said dual pulley when tension on the two belts is substantially equal.

References Cited by the Examiner

UNITED STATES PATENTS

| | | | |
|---|---|---|---|
| 1,680,843 | 8/28 | Bechaud. | |
| 1,935,878 | 11/33 | Hamerstadt | 74—242.13 X |
| 2,089,381 | 8/37 | Kassing | 74—242.12 |
| 2,221,593 | 11/40 | Lessmann | 74—242.12 |
| 2,875,626 | 3/59 | Niederer et al. | 74—242.13 |
| 2,877,907 | 3/59 | Buschbom | 214—17 |

HUGO O. SCHULZ, *Primary Examiner.*